No. 863,805. PATENTED AUG. 20, 1907.
H. N. OTT.
ILLUMINATING APPARATUS FOR MICROSCOPES.
APPLICATION FILED MAY 4, 1906.
2 SHEETS—SHEET 1.
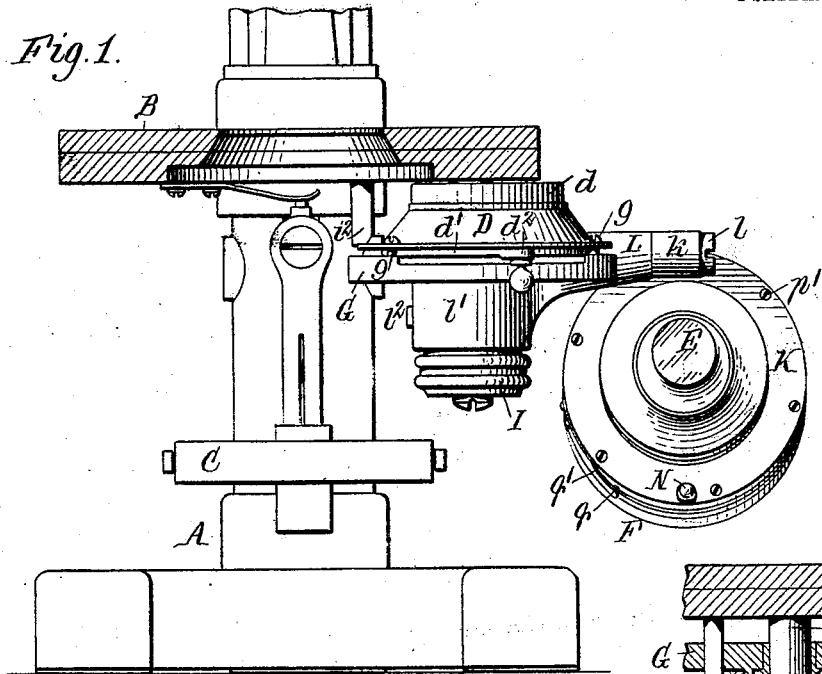
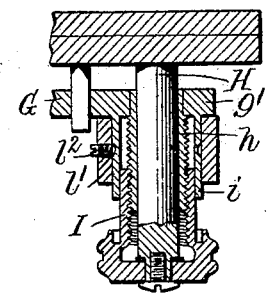
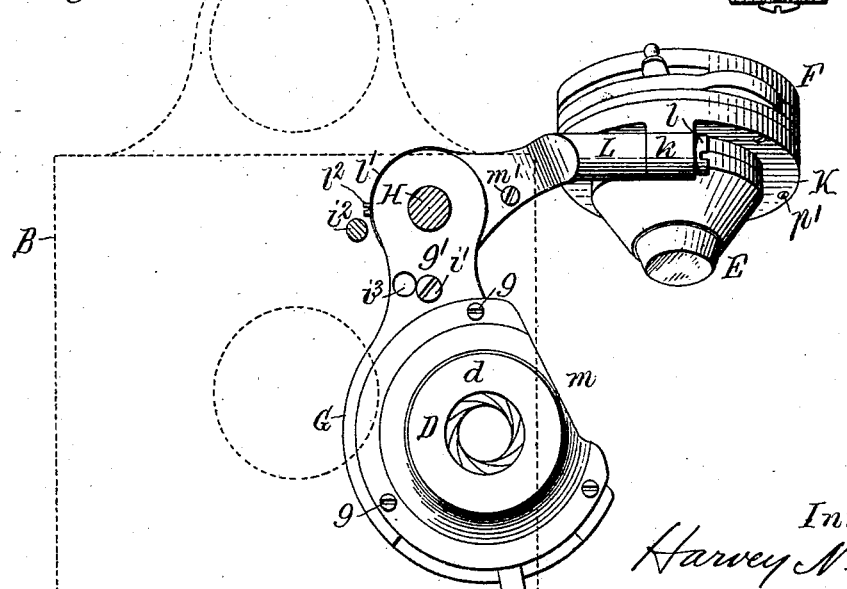
Witnesses:
A. G. Dimond.
E. A. Volk.
Inventor
Harvey N. Ott,
By Wilhelm, Parker & Hard,
Attorneys.

No. 863,805. PATENTED AUG. 20, 1907.
H. N. OTT.
ILLUMINATING APPARATUS FOR MICROSCOPES.
APPLICATION FILED MAY 4, 1906.
2 SHEETS—SHEET 2.
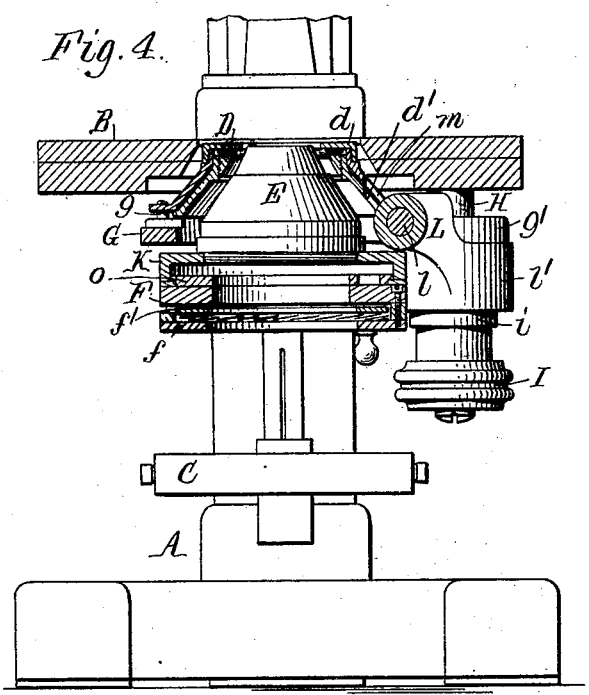
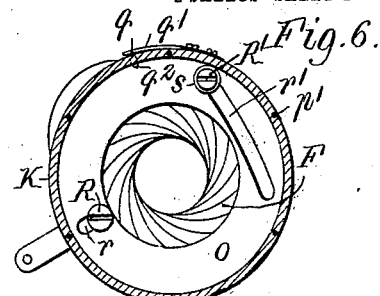
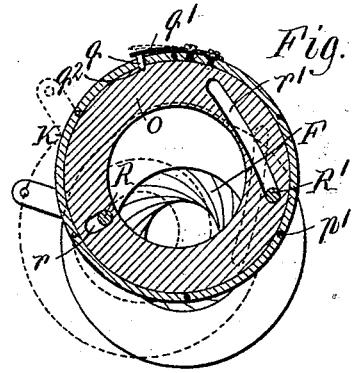
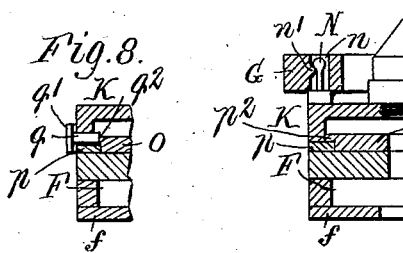
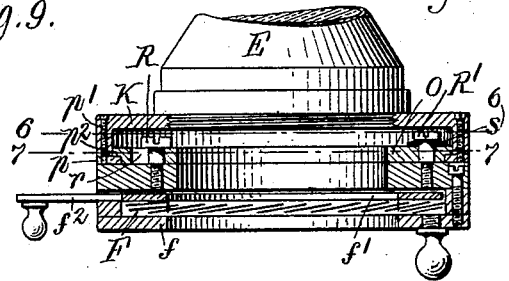
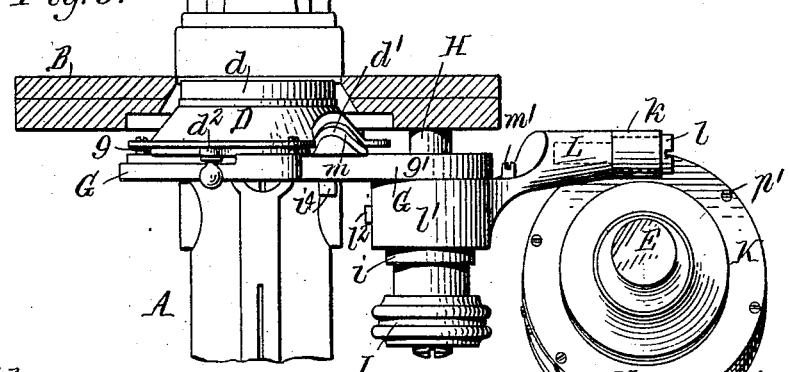
Witnesses:
A. G. Dimond.
E. A. Volk.
Inventor.
Harvey N. Ott,
By Wilhelm, Parker & Hard
Attorneys.
THE NORRIS PETERS CO., WASHINGTON, D. C.

UNITED STATES PATENT OFFICE.

HARVEY N. OTT, OF BUFFALO, NEW YORK, ASSIGNOR TO SPENCER LENS COMPANY, OF BUFFALO, NEW YORK.

ILLUMINATING APPARATUS FOR MICROSCOPES.

No. 863,805.   Specification of Letters Patent.   Patented Aug. 20, 1907.

Application filed May 4, 1906. Serial No. 315,177.

*To all whom it may concern:*

Be it known that I, HARVEY N. OTT, a citizen of the United States, residing at Buffalo, in the county of Erie and State of New York, have invented a new and useful Improvement in Illuminating Apparatus for Microscopes, of which the following is a specification.

This invention relates to illuminating apparatus for microscopes.

The primary object of the invention is to produce a desirable, efficient and simple sub-stage arrangement for supporting those illuminating devices which are usually permanently retained on the stand, such as the upper and lower iris-diaphragms and the condenser, and for permitting the ordinary uses and adjustments of the same.

Other objects of the invention are to provide means of very simple, compact and inexpensive construction which enable all of the devices mentioned to be placed in operative position in the optical axis beneath the stage and adjusted in the optical axis toward or from the stage, or to be readily moved aside together, or as one part, from beneath the stage opening, the condenser and lower diaphragm being also adapted to be quickly and easily moved aside out of the way without moving or disturbing the upper diaphragm, which can then be adjusted toward and from the stage in the optical axis; to provide holders for the upper diaphragm and condenser adapted to be moved separately or together into and out of operative position beneath the stage, and to furnish a single device for adjusting either the upper diaphragm alone or with the condenser in the optical axis, and for moving the upper diaphragm and condenser into and out of operative position; to mount the several illuminating devices mentioned on a single vertical pivot connection depending from the stage on which the devices are movable laterally into and out of the optical axis and also on which they are adjusted in the optical axis by a single screw; and to provide a very simple construction whereby the lower diaphragm can be adjusted horizontally in any desired direction relative to the optical axis for oblique illumination.

Yet another object of the invention is to improve the substage or supporting and adjusting means for the illuminating devices in the respects hereinafter described and set forth in the claims.

In the accompanying drawings, consisting of two sheets: Figure 1 is a front elevation, partly in section, of the lower portion of the stand and illuminating apparatus of a microscope embodying the invention, the upper and lower diaphragms and condenser being swung aside out of the optical axis. Fig. 2 is a plan view, partly in section, of the illuminating apparatus with the parts in the position shown in Fig. 1, the stage being indicated by broken lines. Fig. 3 is a detailed sectional elevation of the pivotal connection and adjusting device for the illuminating apparatus. Fig. 4 is a sectional elevation of the parts shown in Fig. 1, the several illuminating devices being shown in operative position in the optical axis. Fig. 5 is a sectional elevation of a portion of the stand and the illuminating apparatus, showing the upper diaphragm in operative position and the condenser swung to one side. Fig. 6 is a sectional plan view, in line 6—6, Fig. 10, showing the lower diaphragm and the means for permitting the lateral movement of the same for oblique illumination. Fig. 7 is a sectional plan view in line 7—7, Fig. 10, of the parts shown in Fig. 6, this figure showing by full and broken lines different adjustments of the lower diaphragm for oblique illumination. Fig. 8 is a detailed sectional elevation, showing the latch for releasably holding the adjustable support of the lower diaphragm. Fig. 9 is a detailed sectional elevation, showing the releasable fastener for holding the condenser in operative position. Fig. 10 is a fragmentary sectional elevation, on an enlarged scale, of the condenser and lower diaphragm.

Like letters of reference refer to like parts in the several figures.

The illuminating appliances shown in the drawings comprise the usual upper iris-diaphragm, condenser and lower iris-diaphragm. The upper diaphragm is mounted on a holder which is movable vertically on a pivot or post depending from the stage to adjust the diaphragm toward and from the stage in the optical axis, and the diaphragm holder is also adapted, when lowered, to swing horizontally on said post to throw the diaphragm to one side out of the optical axis. The condenser is arranged to extend up into the casing of the upper diaphragm and is carried by a holder which is pivoted to swing upwardly and downwardly, or in a vertical plane, on a supporting arm which in turn is pivoted to swing horizontally about the pivot post for the upper diaphragm and also to move vertically toward and from the stage. The condenser is thus adapted to be swung downwardly out of the diaphragm casing and to be then swung to one side away from the optical axis. The horizontally swinging supporting arm for the condenser is movable vertically with the holder for the upper diaphragm, and is capable of swinging horizontally with or independently of said diaphragm holder, and both parts are adjusted vertically and adapted to be swung into and out of the optical axis by a single adjusting screw mounted on the supporting post, but the condenser can also be swung downwardly and laterally independently of the adjusting screw and without moving or in any wise disturbing the upper diaphragm. The lower diaphragm is mounted on the holder for the condenser and moves with the condenser, but is also capable of lateral adjustment on said holder for producing oblique illumination.

A represents the lower portion of the stand of a microscope, B the stage, and C the mirror which is adjustably supported beneath the stage. These parts may be of any usual or preferred construction.

D represents the upper diaphragm, E the condenser, and F the lower diaphragm. The invention does not relate to the construction of these several devices, but to the manner of mounting and adjusting the same, and each of the devices may be of known or any suitable construction. It is sufficient for the purpose of the present invention to state that the upper diaphragm shown is of the iris type, consisting of a plurality of curved leaves adapted to be adjusted to contract and expand the opening of the diaphragm, and these leaves are arranged in the upper end of a hollow casing $d$ which is of generally conical shape and is adapted to extend up into the opening in the stage, to place the diaphragm in or near to the plane of the top of the stage. The diaphragm leaves are adjusted to contract and expand the diaphragm aperture by a conical shell $d'$ rotatably mounted in the casing $d$ and provided with a projecting operating handle $d^2$. The lower diaphragm F, shown in the drawings, see Fig. 10, is also of the iris-type, consisting of a plurality of adjustable leaves arranged within a hollow casing $f$, and this diaphragm is contracted and expanded by a rotatable ring $f'$ arranged in the casing $f$ and provided with a projecting operating handle $f^2$.

G represents a holder or ring on which the casing of the upper diaphragm is secured, by screws $g$ or in any other suitable manner. This holder is mounted to slide vertically toward and from the stage, and to turn on a stationary supporting pivot or post H which preferably depends from the stage. In the construction shown, see Fig. 3, the diaphragm holder has fixed to an extension $g'$ thereof, in any suitable manner, a sleeve or hub $h$ which surrounds the post H and is adapted to slide and turn thereon. This hub is externally screw-threaded and enters an internally threaded nut or screw I which is secured to rotate but is held from longitudinal movement on the lower end of the post H. By turning this screw or nut, the hub $h$, with the holder G and upper diaphragm carried thereby are moved vertically on the pivot post, and the direction of the screw thread is such that by turning the screw or nut I in one direction the diaphragm holder will be lowered, and when it reaches the limit of its downward movement it will be turned horizontally to one side on the pivot post. The extension of the diaphragm holder is also provided with a depending sleeve $i$ which surrounds and is adapted to telescope on the adjusting screw or nut to inclose and protect the threaded hub. This manner of mounting and adjusting the upper diaphragm is known. Means of known construction are also provided for arresting the horizontal movement of the diaphragm holder when the axis of the diaphragm is coincident with the optical axis, in swinging it into operative position and for holding and guiding the diaphragm in its vertical adjustments in the optical axis. The stop and guide means consist of a stud or projection $i'$, on the diaphragm holder G, adapted to strike a coöperating stud $i^2$ depending from the stage, see Figs. 1 and 2, and the diaphragm holder is provided with a perforation $i^3$ which registers with the stud $i^2$ when the diaphragm is thus in the optical axis. The stud enters the hole when the diaphragm holder is raised and prevents the diaphragm holder from swinging while being adjusted vertically. The diaphragm holder must be lowered far enough to clear the stud $i^2$ before it can be swung aside.

K represents a ring or holder for the condenser which, in the construction shown, is screwed into the opening of this ring or holder, so that the condenser can be removed from the holder when not required and when it is desired to utilize the holder for supporting other known illuminating accessories, not shown. The condenser holder is provided at one side with a hinge lug $k$ which is pivoted, in any suitable manner, on the outer end of a horizontal arm or support L to permit the holder to swing vertically. This arm L will be hereinafter referred to as the condenser support. The hinge lug $k$ preferably surrounds and turns on a reduced portion of the condenser support L, being held from longitudinal movement thereon by a screw $l$ screwed into the end of the support. The condenser support is provided at its inner end with a hub or sleeve $l'$ which loosely surrounds the dust sleeve of the upper diaphragm holder G. The condenser support is held from vertical movement on the sleeve $i$ but is permitted to turn thereon in any suitable manner, a screw $l^2$ passing through the hub of the support and entering a circumferential groove in the sleeve $i$ being shown for this purpose, see Fig. 3. This construction permits the condenser support to swing laterally or horizontally independently of the upper diaphragm holder G, but causes the condenser support to move vertically toward and from the stage when said diaphragm holder is adjusted vertically on the pivot post H. The condenser support is adapted to swing horizontally toward the optical axis to the position shown in Fig. 4, when the condenser ring can be swung vertically on its pivotal connection with the support up into the hollow holder and casing of the upper diaphragm. The holder, casing and shell of the upper diaphragm, in the construction shown, see Figs. 4 and 5, are cut away at one side at $m$ to receive the end of the condenser support. The latter is arrested, when in the proper position for the condenser, to swing up into operative position by any suitable means, such as a stud or screw $m'$, Figs. 2 and 5, secured to the condenser support and adapted to strike the extension $g'$ of the upper diaphragm holder. Any suitable releasable fastening for holding the condenser up in operative position may be employed. A headed pin N is shown, see Fig. 9, secured to the condenser ring and adapted to enter a hole $n$ in the stage and snap over a projection $n'$ in said hole. The spring pin can be released from the hole and the condenser swung downwardly on its pivotal connection with the support, by pulling downwardly on the condenser ring. After the condenser is thus swung downwardly out of the casing of the upper diaphragm its support can be swung laterally to carry the condenser to one side out of the way, without moving or disturbing the upper diaphragm, as indicated in Fig. 5. The upper diaphragm can be adjusted vertically in the optical axis toward and from the stage by the adjusting screw or nut I after the condenser is thus swung aside, and the diaphragm can be contracted or expanded as required. When the condenser is in operative position, shown in Fig. 4, it, together with the upper diaphragm, can be adjusted vertically toward and from the stage by the same adjusting screw I. When the condenser is in this position it projects up into the diaphragm opening to enable it to be adjusted as near to the object slide as required. The upper diaphragm is not ordinarily used with the condenser and the cut out portion $m$ of the diaphragm shell is adapted to strike the condenser support G to prevent the diaphragm from being contracted on the condenser and injured. When it is desired to remove the upper and lower diaphragms and condenser together out of operative position, this can be done by turning the adjusting screw I to lower the holder for the upper diaphragm until the holder clears the guide pin $i^2$, when a continued turning of the screw in the same direction will swing the several illuminating devices, as one part, to one side out of the optical axis.

If it is desired to remove the upper diaphragm out of operative position after the condenser has been swung aside, as above explained and shown in Fig. 5, this can be done by lowering the upper diaphragm holder and swinging it aside by means of the adjusting screw I, as indicated in Figs. 1 and 2. The illuminating apparatus can be swung back beyond the position indicated in the drawings, until arrested by striking the column of the microscope stand.

The lower diaphragm, as above explained, is carried by the holder K for the condenser. The casing $f$ of the lower diaphragm, see Figs. 6–10, is arranged beneath the condenser holder and is preferably adjustably secured thereto as follows:

O represents a supporting ring which is arranged within the condenser holder K, being retained in place therein by a ring $p$ fixed by screws $p'$, or otherwise, to the condenser holder, and extending inwardly beneath an outwardly projecting flange $p^2$ on the supporting ring O. This supporting ring O is capable of turning in the condenser holder but is normally held stationary therein by a latch pin $q$ which is secured to the free end of a spring $q'$, Figs. 6 and 8, fastened on the outside of the condenser holder and projects through a hole in the condenser holder into a notch $q^2$ in the edge of the supporting ring O for the lower diaphragm. The inner end of the latch pin $q$ is D-shaped or rounded and will yield to release the supporting ring for the lower diaphragm when the latter is forcibly turned. When the supporting ring O is returned to the initial position the latch pin will snap into the notch in the ring and releasably retain the same in its normal position. Any other suitable releasable holding device for the supporting ring could be used. The casing of the lower diaphragm is supported from the ring O by two headed studs or screws R and R' secured to the casing and passing through slots $r$ and $r'$ in the supporting ring. The slot $r$ is elongated in a direction substantially radial of the supporting ring, while the other slot $r'$ is elongated in a direction substantially tangential of the ring, or at an angle to the length of the slot $r$. This arrangement of the slots enables the casing of the lower diaphragm to be swung horizontally or laterally about the stud R as a pivot, from a position concentric with the supporting ring, as shown in Fig. 6, to an eccentric position, such as shown in Fig. 7. The tangential slot $r'$ is preferably curved so that the axis of the diaphragm will move in a substantially straight line from its concentric to its eccentric position. This effect is secured by curving the tangential slot $r'$ on a radius substantially two and one-half times the distance from said slot to the pivot stud R. The normal position of the supporting ring for the lower diaphragm, in which it is held by the latch pin $q$, is also preferably such that the lower diaphragm casing will move forwardly and rearwardly on the supporting ring with respect to the stage, for producing oblique illumination. The oblique illuminating pencil can be applied in any desired azimuth, by turning the supporting ring O for the lower diaphragm about the optical axis in the condenser holder and then moving the diaphragm casing laterally on the supporting ring. The lower diaphragm casing is conveniently held frictionally in the position to which it is moved on its supporting ring by a spring washer $s$, Figs. 6 and 10, surrounding the stud R' between its head and the supporting ring O. This washer is flexed sufficiently in tightening up the stud or screw R' to produce the necessary friction on the supporting ring. This manner of movably or adjustably mounting the lower diaphragm on the condenser holder is exceedingly simple and permits all of the adjustments which can be secured by the more expensive and cumbersome rack-and-pinion-operated slide heretofore employed.

I claim as my invention:

1. In a microscope, the combination of a support for an illuminating device arranged to swing laterally beneath the stage toward and from the optical axis, and an illuminating device carried by said support and arranged to swing thereon into and out of operative position while said support is beneath the stage, substantially as set forth.

2. In a microscope, the combination of a support for an illuminating device arranged to swing laterally beneath the stage toward and from the optical axis, and an illuminating device carried by said support and arranged to swing downwardly thereon out of operative position, substantially as set forth.

3. In a microscope, the combination of a support for an illuminating device arranged to swing laterally beneath the stage toward and from the optical axis, an illuminating device carried by said support and arranged to swing thereon into and out of operative position while said support is beneath the stage, and means for adjusting said device in the optical axis, substantially as set forth.

4. In a microscope, the combination of a support for an illuminating device arranged to swing laterally beneath the stage toward and from the optical axis, and a condenser carried by said support and arranged to swing thereon into and out of operative position while said support is beneath the stage, substantially as set forth.

5. In a microscope, the combination of a diaphragm and a condenser mounted to be moved together laterally into and out of the optical axis, said condenser being also movable into and out of the optical axis independently of said diaphragm, substantially as set forth.

6. In a microscope, the combination of a diaphragm and a condenser mounted to be moved together laterally into and out of the optical axis and also to be adjusted together in the optical axis toward and from the stage, said condenser being also movable into and out of the optical axis independently of said diaphragm, substantially as set forth.

7. In a microscope, the combination of a diaphragm and a condenser pivoted to swing together laterally about the same axis into and out of the optical axis, said condenser being also arranged to swing into and out of the optical axis independently of said diaphragm, substantially as set forth.

8. In a microscope, the combination of a diaphragm and its holder, a condenser, a support on which the condenser is movable into and out of the diaphragm holder, and which support is pivoted to swing laterally, said condenser being mounted to swing downwardly out of the diaphragm holder and to swing laterally with said support without movement of said diaphragm holder, substantially as set forth.

9. In a microscope, the combination of a diaphragm, a holder therefor which is movable toward and from the stage and also laterally, a condenser, a support on which the condenser is movable into and out of the diaphragm holder and which is movable laterally together with and independently of the diaphragm holder, and means for adjusting the condenser support and diaphragm holder together toward and from the stage, substantially as set forth.

10. In a microscope, the combination of a diaphragm, a condenser, a support on which the condenser is mounted to swing into and out of position in the optical axis beneath the diaphragm and which support is pivoted to swing laterally, and means for adjusting said condenser support toward and from the stage on its pivotal connection, substantially as set forth.

11. In a microscope, the combination of a diaphragm mounted to swing laterally into and out of the optical axis, a condenser support arranged to swing laterally toward and from the optical axis about the same pivotal axis as the diaphragm, and a condenser pivoted on said support to swing downwardly out of operative position beneath the diaphragm, substantially as set forth.

12. In a microscope, the combination of an upper diaphragm and a condenser mounted to be moved together into and out of the optical axis, said condenser being also movable into and out of the optical axis independently of said upper diaphragm, and a lower diaphragm connected to and movable with said condenser, substantially as set forth.

13. In a microscope, the combination of a condenser and a diaphragm above the condenser, both mounted to move laterally into and out of the optical axis and both adjustable in the optical axis, means for both adjusting the condenser and diaphragm in the optical axis and moving them into and out of the optical axis, and a lower diaphragm connected to and movable with the condenser, said lower diaphragm being also independently adjustable laterally for oblique illumination, substantially as set forth.

14. In a microscope, the combination of a diaphragm, a holder for the diaphragm, a pivotal connection for said holder on which it swings laterally and is vertically movable, a condenser, a separate support for the condenser also mounted on said pivotal connection, and an adjusting screw for adjusting the diaphragm and condenser vertically on said pivotal connection, substantially as set forth.

15. In a microscope, the combination of a diaphragm, a vertical pivot post, a holder for the diaphragm provided with a sleeve arranged to slide and swing on said pivot post, a condenser, a separate condenser support pivoted to swing but held from longitudinal movement on the sleeve of said diaphragm holder, and a screw rotatably secured to said pivot post for adjusting said diaphragm holder vertically on said pivot post, substantially as set forth.

16. In a microscope, the combination of a lower diaphragm, a support for holding said diaphragm in operative position, and a pivotal and sliding connection between said diaphragm and said support, whereby the axis of the diaphragm is movable laterally relative to the optical axis and the axis of the diaphragm is caused to move in a substantially straight line, substantially as set forth.

17. In a microscope, the combination of a support provided with a substantially radial and a substantially tangential slot, a diaphragm provided with studs movable in said slots, whereby the diaphragm has a pivotal sliding connection with said support, substantially as set forth.

18. In a microscope, the combination of a lower diaphragm, a support for the same which is rotatably adjustable, and a pivotal and sliding connection between said diaphragm and support whereby the diaphragm can be moved laterally on said support, substantially as set forth.

19. In a microscope, the combination of a condenser, a supporting ring therefor, a diaphragm below said condenser, and a pivotal and sliding connection between said diaphragm and condenser supporting ring, substantially as set forth.

20. In a microscope, the combination of a condenser, a supporting ring therefor, a diaphragm support rotatably adjustable on said ring, and a diaphragm having a pivotal sliding connection with said diaphragm support, substantially as set forth.

Witness my hand, this 1st day of May, 1906.

HARVEY N. OTT.

Witnesses:
C. W. PARKER,
C. B. HORNBECK.